US008876207B1

(12) United States Patent
Chapman et al.

(10) Patent No.: US 8,876,207 B1
(45) Date of Patent: Nov. 4, 2014

(54) ADJUSTABLE BOOSTER SEAT

(71) Applicants: Brian Chapman, Avon, IN (US); Carl Stacy, Avon, IN (US)

(72) Inventors: Brian Chapman, Avon, IN (US); Carl Stacy, Avon, IN (US)

(*) Notice: Subject to any disclaimer, the term of this patent is extended or adjusted under 35 U.S.C. 154(b) by 0 days.

(21) Appl. No.: 14/315,175

(22) Filed: Jun. 25, 2014

Related U.S. Application Data

(62) Division of application No. 13/906,242, filed on May 30, 2013.

(60) Provisional application No. 61/665,253, filed on Jun. 27, 2012.

(51) Int. Cl.
*A47D 1/10* (2006.01)
*B60N 2/26* (2006.01)
*B60N 2/28* (2006.01)
*B60N 2/16* (2006.01)

(52) U.S. Cl.
CPC .............. *B60N 2/265* (2013.01); *B60N 2/2866* (2013.01); *B60N 2/164* (2013.01)
USPC ................................ 297/256.11; 297/344.17

(58) Field of Classification Search
USPC ......... 297/344.17, 339, 256.11, 250.1, 256.1; 248/422, 188.4
See application file for complete search history.

(56) References Cited

U.S. PATENT DOCUMENTS

| | | | | |
|---|---|---|---|---|
| 4,232,901 A | * | 11/1980 | Harrington et al. | 297/423.45 |
| 5,695,248 A | * | 12/1997 | Bell | 297/344.17 |
| 6,170,914 B1 | * | 1/2001 | Chang | 297/339 |
| 6,296,259 B1 | * | 10/2001 | Anderson | 280/30 |
| 7,032,970 B1 | * | 4/2006 | Kharat | 297/256.11 |

FOREIGN PATENT DOCUMENTS

| | | | |
|---|---|---|---|
| JP | 04354905 A | * | 12/1992 |
| JP | 06284939 A | * | 10/1994 |

* cited by examiner

*Primary Examiner* — Milton Nelson, Jr.
(74) *Attorney, Agent, or Firm* — Lyman Smith

(57) ABSTRACT

An adjustable booster seat can raise and lower to provide a variable height so that a seat belt can properly fit a child as they grow. Therefore, as the child grows, the booster seat height can be adjusted, providing the shoulder strap of the seat belt a proper, safe, and non-irritating fit about the child. The adjustable booster seat could include a knob for manual adjustment of the height of the seat, or could include a motor to provide for motorized adjustment of the height of the seat.

4 Claims, 4 Drawing Sheets

US 8,876,207 B1

ADJUSTABLE BOOSTER SEAT

CROSS-REFERENCE TO RELATED APPLICATION

This application is a divisional application of U.S. patent application Ser. No. 13/906,242, currently pending, which claims the benefit of priority of U.S. provisional application No. 61/665,253, filed Jun. 27, 2012, the contents of which are herein incorporated by reference.

BACKGROUND OF THE INVENTION

The present invention relates to booster seats and, more particularly, to an adjustable booster seat to provide a proper seat belt fit for children of various heights.

Conventional booster seats are designed at a fixed height. Typical backseat seat belts are not adjustable. Therefore, a parent must buy a booster seat for not only the proper height of the child, but also to take into consideration the positioning of the backseat seat belts, in order to achieve a proper height of the shoulder strap portion of the seat belt.

Many states have laws that require booster seats for children after they outgrow the car seat. While the age and/or height requirements vary from state to state, many states require booster seats for children between 4 and 7 years old. This can result in a financial burden, as booster seats can be expensive to purchase, and a child can grow significantly between the ages of 4 and 7. Thus, the booster seat purchased to fit properly when the child was 4 years old will most likely not fit properly when the child is 7 years old.

An improper fitting booster seat can result in a seat belt causing injury to a child's neck or back. If the seat belt is further mis-fitting, the child could get out of the seat belt all together or the seat belt could move under the arm or feet of the child.

As can be seen, there is a need for a booster seat that can adjust in height to accommodate children as they grow so a proper seat belt fit can be achieved.

SUMMARY OF THE INVENTION

In one aspect of the present invention, an adjustable booster seat comprises a seat portion; a seat base; and a lift mechanism, disposed between the seat portion and the seat base, the lift mechanism operable to raise and lower the seat portion.

In another aspect of the present invention, an adjustable booster seat comprises a seat portion; a seat base; a lift mechanism, disposed between the seat portion and the seat base, the lift mechanism operable to raise and lower the seat portion; a knob extending from one side or opposite sides of side walls interconnecting the seat portion with the seat base, the knob operating the lift mechanism, wherein the knob turns a side-to-side screw member, the side-to-side screw member turns front-to-back screw members disposed on each side of the seat base, and the front-to-back screw members raise and lower lift rods to raise and lower the seat portion; and gear boxes disposed to translate rotation of the side-to-side screw member into rotation of the front-to-back screw members.

In a further aspect of the present invention, an adjustable booster seat comprises a seat portion; a seat base; a lift mechanism, disposed between the seat portion and the seat base, the lift mechanism operable to raise and lower the seat portion, the lift mechanism including a side-to-side screw member, the side-to-side screw member turning front-to-back screw members disposed on each side of the seat base, and the front-to-back screw members raising and lowering lift rods to raise and lower the seat portion; and a motor disposed to drive the side-to-side screw member to effectively raise and lower the seat portion of the adjustable booster seat.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an adjustable booster seat that can raise and lower to provide a variable height so that a seat belt can properly fit a child as they grow. Therefore, as the child grows, the booster seat height can be adjusted, providing the shoulder strap of the seat belt a proper, safe, and non-irritating fit about the child. The adjustable booster seat could include a knob for manual adjustment of the height of the seat, or could include a motor to provide for motorized adjustment of the height of the seat.

Figure 1:
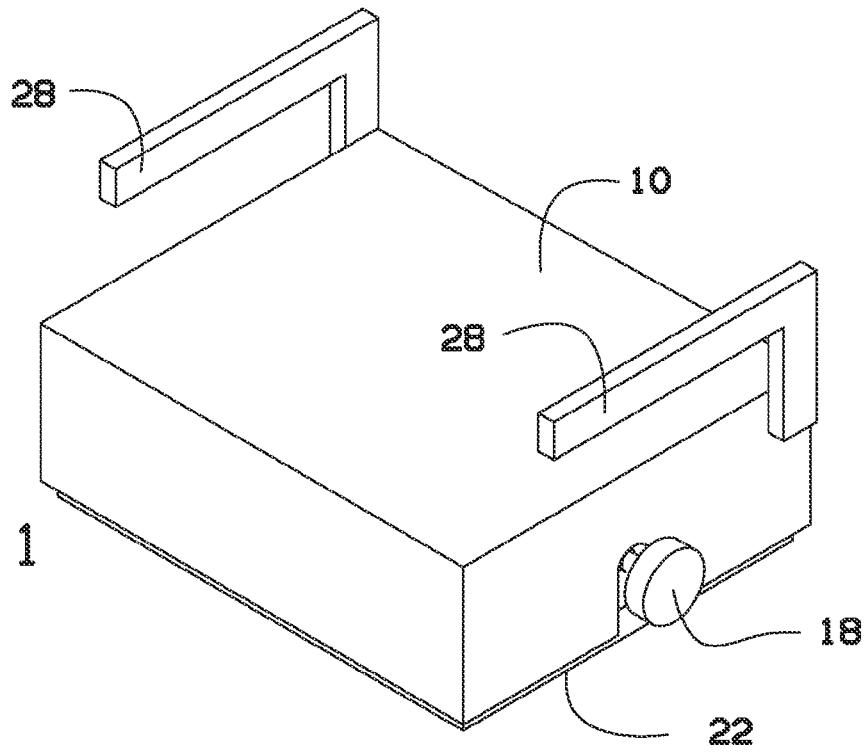
FIG. 1 is a perspective view of an adjustable booster seat, in a lowered configuration, according to an exemplary embodiment of the present invention.
Figure 8:
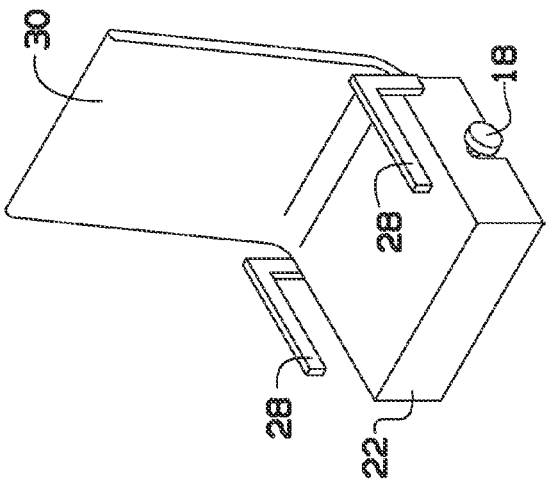
FIG. 8 is a perspective view of an adjustable booster seat, in a lowered configuration, according to an exemplary embodiment of the present invention.

Referring now to FIGS. 1 through 6, an adjustable booster seat can include a seat portion 10 and, typically, arm rests 28 on each side of the seat portion 10. While FIG. 1 schematically shows such an adjustable booster seat having a seat portion 10 and two arm rests 28, it should be noted that the booster seat could include various comfort features, including padding, cup holders, trays, seat belt guides, a back rest 30 (see FIG. 8), or the like.

Figure 2:
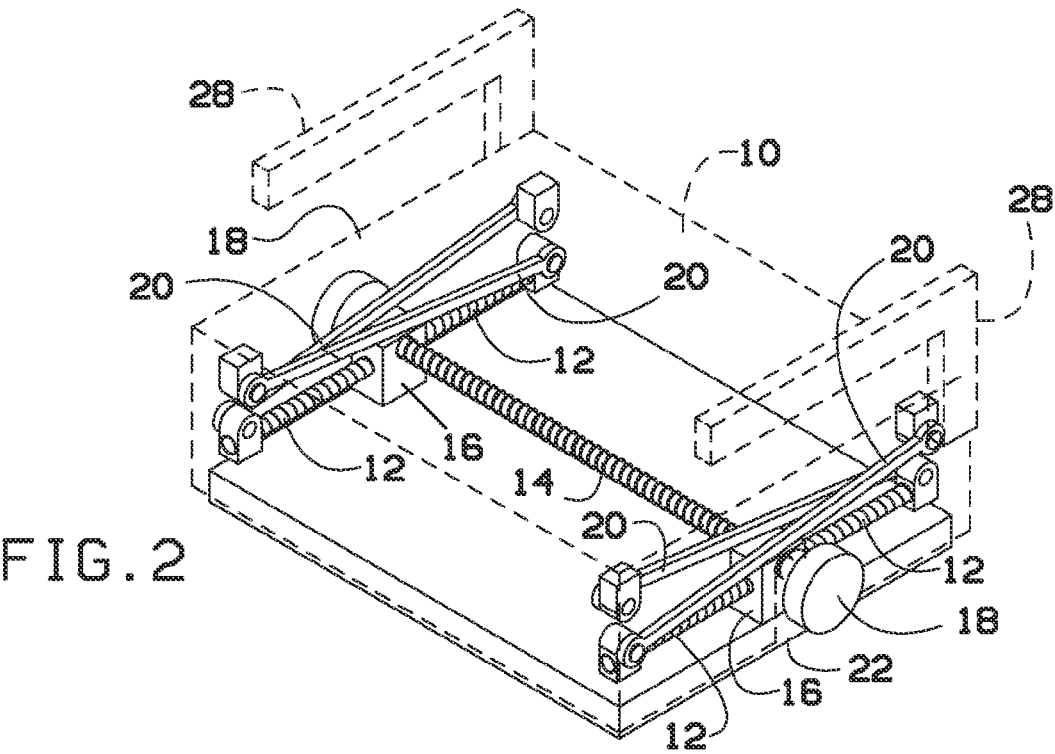
FIG. 2 is a perspective view of the adjustable booster seat of FIG. 1, with a seat portion removed to show its internal lift assembly in a lowered configuration.
Figure 3:
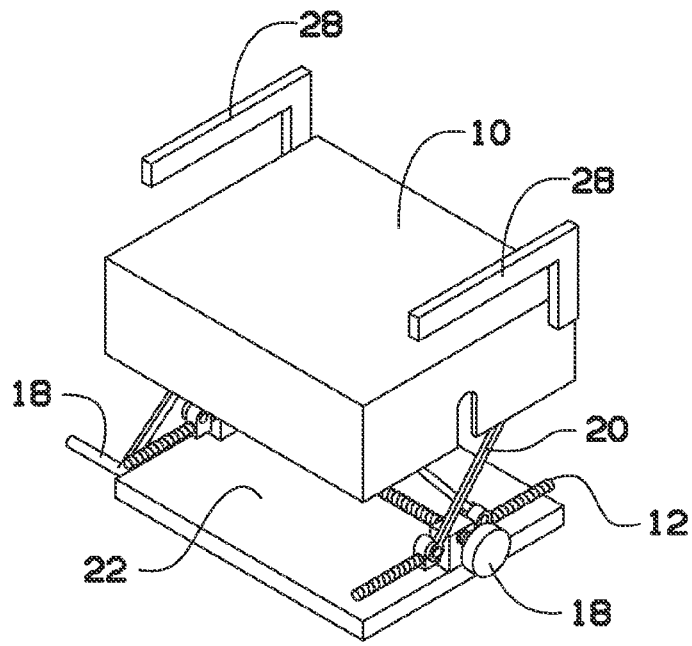
FIG. 3 is a perspective view of an adjustable booster seat, in a raised configuration, according to an exemplary embodiment of the present invention.
Figure 4:
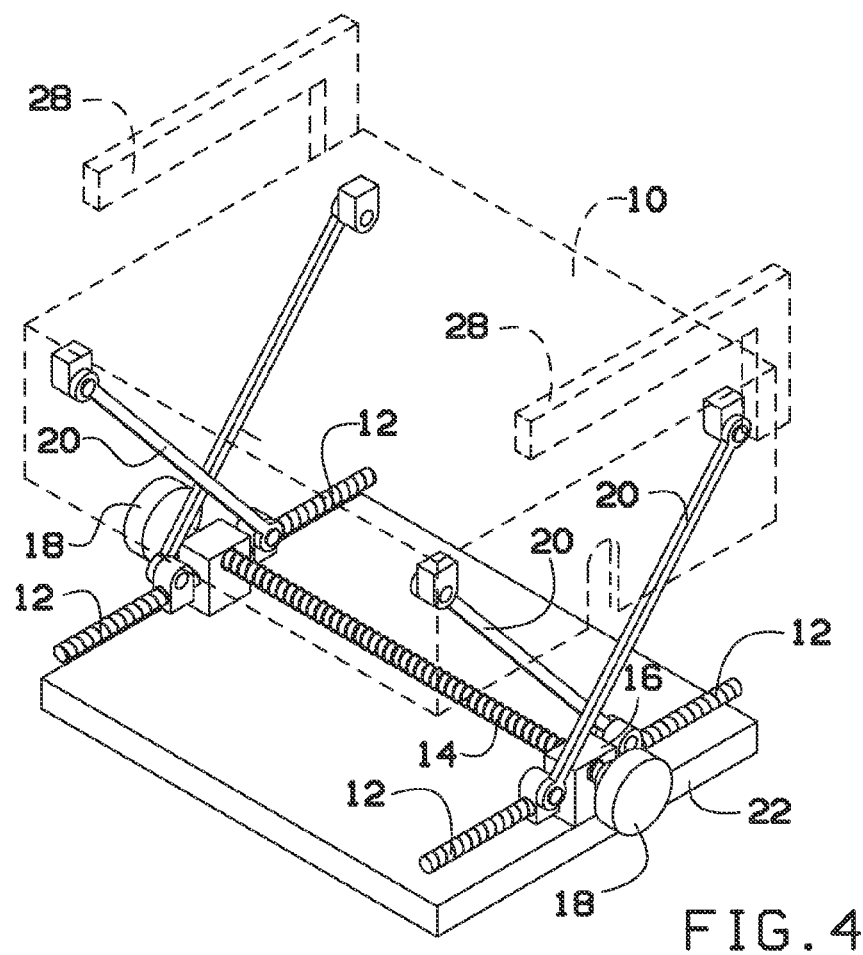
FIG. 4 is a perspective view of the adjustable booster seat of FIG. 3, with a seat portion removed to show its internal lift assembly in a raised configuration.
Figure 5:
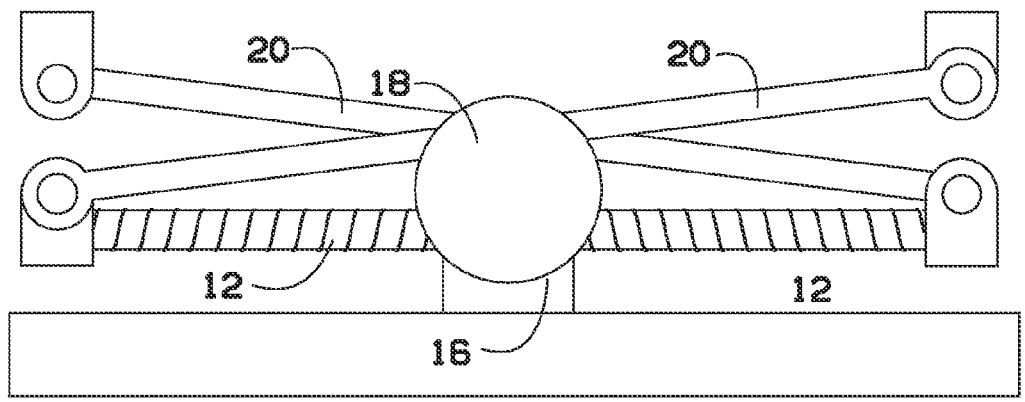
FIG. 5 is a side view of the lift assembly of the adjustable booster seat of FIG. 1, shown in a lowered configuration.
Figure 6:
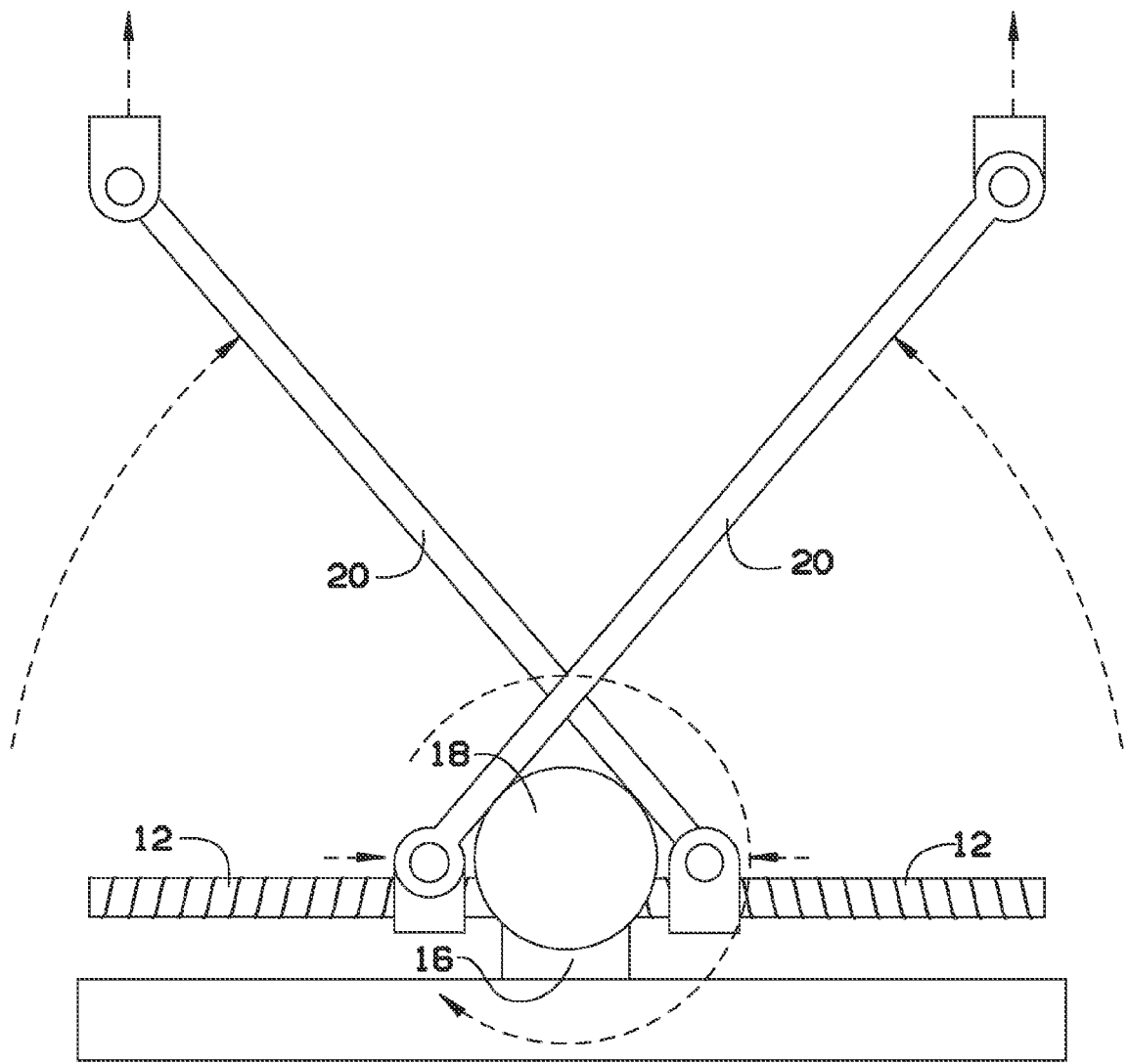
FIG. 6 is a side view of the lift assembly of the adjustable booster seat of FIG. 1, shown in a raised configuration.

The adjustable booster seat can include a knob 18 extending from one or both sides of the adjustable booster seat, as shown, for example, in FIG. 2. In some embodiments, the knob 18 may extend from a front edge of the booster seat. Regardless of design, turning the knob 18 can result in the seat portion 10 raising or lowering its height. This height adjustment may be achieved in various manners.

In some embodiments, a scissor lift type of mechanism can be used, where turning the knob 18 rotates a side-to-side screw member 14, resulting in the rotation of front-to-back screw members 12 disposed along each side, under the seat portion 10. A gear box 16 can be used to translate the rotation of the side-to-side screw member 14 into rotation of the front-to back screw members 12. Rotation of the front-to-back screw member 12 can cause lift rods 20 to raise and lower the seat member 10. The lift mechanism can be supported by a seat base 22 that provides support for the lift mechanism and protects the car seat (not shown) from direct contact with the lift mechanism.

Figure 7:
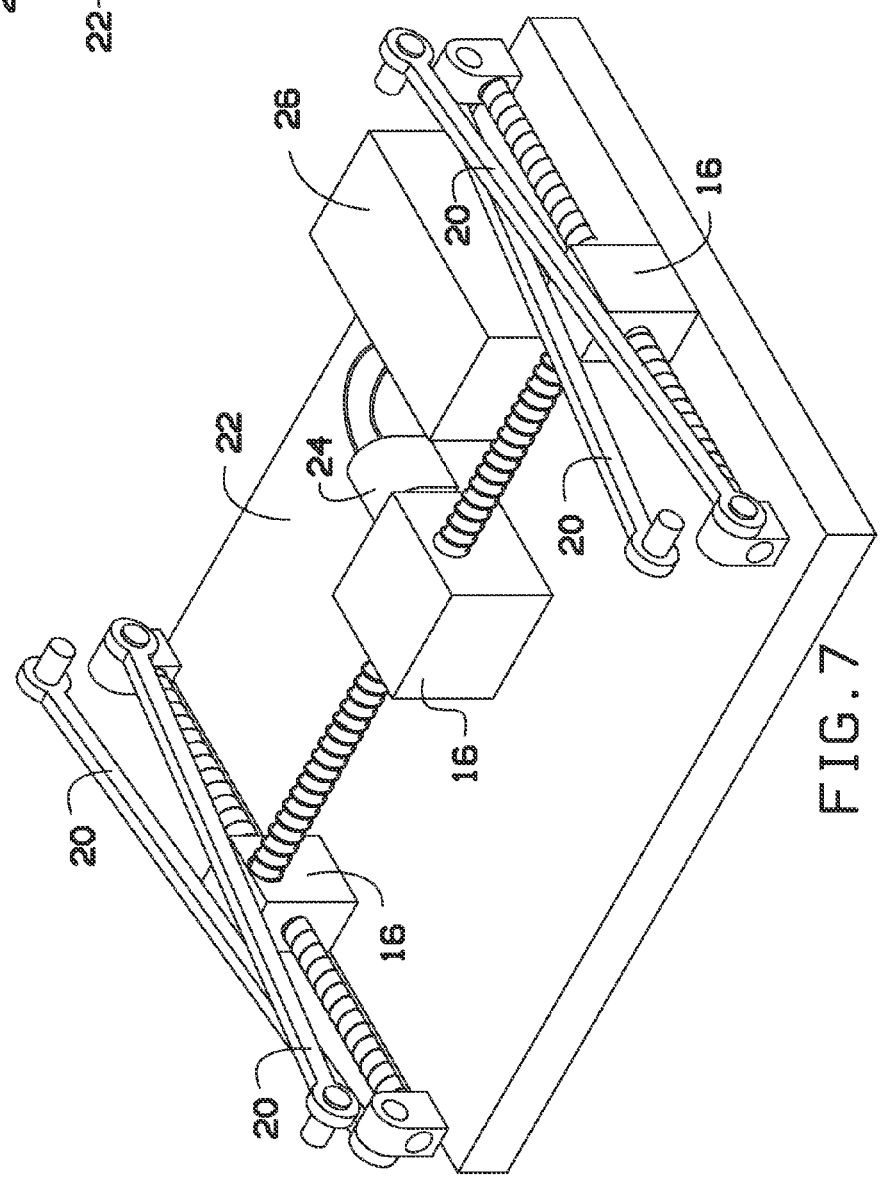
FIG. 7 is a perspective view of an motorized lift assembly for an adjustable booster seat according to an exemplary embodiment of the present invention.

Referring now to FIG. 7, in some embodiments of the present invention, a motor 24 can be used to drive the side-to-side screw member 14. An optional gear box 16 can be used to provide an interface between the output of the motor 24 and the side-to-side screw member 14. The motor 24 can be powered, for example, by a rechargeable battery 26 or via a power cord operable to plug into a vehicle power source. The battery 26 may be removable so that the battery 26 could be recharged without the need to remove the entire booster seat from the vehicle.

In some embodiments, height adjustment lockout features can be provided so that the height adjustment cannot be made, for example, by the child unknowingly to the parent. This lockout feature could include a lock pin or a motor cutoff switch, for example.

It should be understood, of course, that the foregoing relates to exemplary embodiments of the invention and that modifications may be made without departing from the spirit and scope of the invention as set forth in the following claims.

What is claimed is:

1. An adjustable booster seat comprising:
   a seat portion;
   a seat base;
   a lift mechanism, disposed between the seat portion and the seat base, the lift mechanism operable to raise and lower the seat portion, the lift mechanism including a side-to-side screw member, the side-to-side screw member turning front-to-back screw members disposed on each side of the seat base, and the front-to-back screw members raising and lowering lift rods to raise and lower the seat portion; and
   a motor disposed to drive the side-to-side screw member to effectively raise and lower the seat portion of the adjustable booster seat.

2. The adjustable booster seat of claim 1, further comprising gear boxes disposed to translate rotation of the side-to-side screw member into rotation of the front-to-back screw members.

3. The adjustable booster seat of claim 1, further comprising arm rests extending from sides of the seat portion.

4. The adjustable booster seat of claim 1, further comprising a back rest extending from a back side of the seat portion.

* * * * *